May 23, 1961 J. G. RAFFAELLI 2,985,848
VANE CONTROLLED TRANSISTOR OSCILLATOR
Filed Aug. 16, 1957
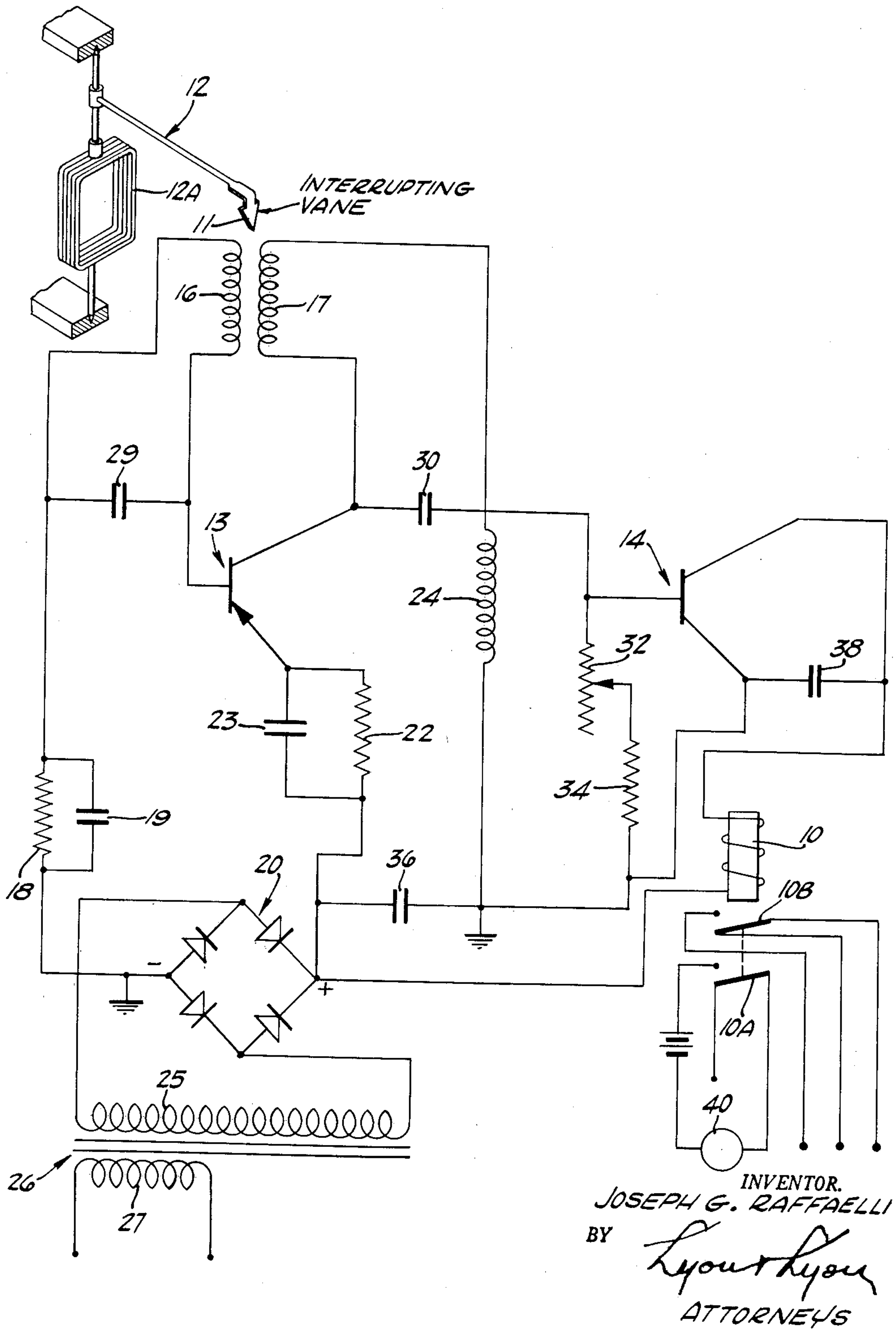
INVENTOR.
JOSEPH G. RAFFAELLI
BY Lyon & Lyon
ATTORNEYS 2,985,848

VANE CONTROLLED TRANSISTOR OSCILLATOR

Joseph G. Raffaelli, Bell, Calif., assignor to General Controls Co., Glendale, Calif., a corporation of California Filed Aug. 16, 1957, Ser. No. 678,702

2 Claims. (Cl. 331—117)

The present invention relates to improved control apparatus which uses an oscillator that is made responsive to a condition as measured, for example, by a D'Arsenval type of movement and, more specifically, to a transistor oscillator incorporating means whereby the same may be adjusted to provide an adjustable range through which a vane may be moved to change the oscillator from an oscillating state to a nonoscillating state and vice versa.

Briefly, the arrangement described herein incorporates a vane which is attached to and moved by a D'Arsenval type of movement with respect to a coil of a transistor oscillator to change the oscillator from an oscillating condition to a nonoscillating condition and vice versa, in accordance with the energization of the D'Arsenval type of movement. A feature of this transistor oscillator is that its loading may be adjusted to, in turn, adjust the range within which the vane may move to effect such operation.

An object of the present invention therefore is to provide an improved system of the character indicated above.

A specific object of the present invention is to provide an improved oscillator circuit which is controlled by a vane.

Another specific object of the present invention is to provide a system of this type in which the loading of the oscillator may be adjusted to change the range of operation.

Another specific object of the present invention is to provide a system of this type which is admirably suited for use with a sensitive type of instrument of the D'Arsenval type such as millivoltmeters or pyrometers where the available torque on the instrument pointer is extremely low and any physical contact or very weak electromagnetic, thermal or other contacts must be avoided to prevent impairment of the meter readings.

Another specific object of the present invention is to provide a transistor oscillator for these purposes.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which the figure illustrates a system embodying features of the present invention.

In general, the system shown herein serves to control the energization of a relay 10 in accordance with the position of a vane 11 which is connected to and moved by a D'Arsenval type of movement 12 such as, for example, found in millivoltmeters or pyrometers.

The apparatus includes two transistors 13 and 14 connected respectively in an oscillator and an amplifying circuit. Very small currents flow through the coil 12A for changing the position of the movable vane 11 with respect to the stationary coils 16 and 17. The vane 11 is interposed between such coils.

The transistor 13 has its base electrode connected through coil 16 and the parallel connected resistance 18 and condenser 19 to the negative grounded terminal of the voltage source which, in this instance, comprises a full wave rectifier 20. The positive terminal of such source is connected to the emitter of transistor 13 through the parallel connected resistance 22 and condenser 23. The collector electrode of transistor 13 is returned to ground through a circuit which includes the coils 17 and 24. The coils 16 and 17 are inductively coupled together and are each in inductive relationship with respect to the vane 11 which is of conducting material such as, for example, aluminum, having thickess of, for example, 3/1000 of an inch. The full wave rectifier 20 has its input terminals connected to the secondary winding 25 of transformer 26, having the primary winding 27 to which alternating current from a convenient source is connected.

Condenser 29 is connected in shunt with coil 16 for proper phasing. Resistance 18 serves in general a function similar to that of a grid leak resistance in an electronic tube oscillator. Condenser 19 serves as a bypass condenser for the oscillations which may, for example, be in the order of 100 kilocycles. Resistance 22 serves as a bias resistance and is shunted by the condenser 23 which serves as a bypass and also as a frequency determining element.

The collector of transistor 13 is coupled via coupling condenser 30 to the base of the amplifying transistor 14, such base being returned to ground through the adjustable resistance 32 and fixed resistance 34. The collector electrode of transistor 14 is connected to the positive terminal of source 20 through the winding on relay 10, it being noted that the voltage of such source 20 is filtered to substantially eliminate 60 cycle ripple by the use of a filter condenser 36 which is connected between the positive terminal of source 20 and ground.

The emitter of transistor 14 is grounded. A bypass condenser 38 is connected between the collector of transistor 14 and ground.

Suitably normally open or normally closed switches 10A and 10B, respectively, that are operated by the relay 10, serve to control the energization of control devices such as, for example, a solenoid valve 40 that controls the flow of fuel to a flame or to supply electric current to a furnace, the temperature of which determines the current flowing in coil 12A and, hence, the position of the vane 11.

During normal operation, the vane 11 is at all times between the coils 16 and 17. Movement of the vane 11 upwardly to a certain position results in oscillations being generated in the oscillator comprising transistor 13 and such oscillations are amplified in the amplifying stage comprising transistor 14 to effect energization of relay 10 and consequently actuation of the switches 10A and 10B. When the vane 11 is moved downwardly a sufficiently large distance, sufficient amount of eddy currents are developed in the aluminum vane 11 so as to stop oscillations, in which case the relay 10 is in its deenergized position shown in the drawings.

Another important feature of the present invention is that the range of movement of the vane 11 to initiate and stop oscillations may be adjustably controlled by adjustment of the resistance 32. This is so because the magnitude of resistance 32 effects the loading of the oscillator. When the resistance 32 is adjusted to have its maximum magnitude, the system is most sensitive in that only a small degree of movement of the vane 11, in the order of 1/1000 of an inch, causes the oscillator to change from its oscillating state to its nonoscillating state, or vice versa, this being so since the loading imposed by resistance 32 is the smallest. When the resistance 32 has its smallest value, i.e., zero value, the loading of the oscillator is increased and the system is less sensitive in that the vane 11 is required to move a distance of approximately 20 to 25 thousandths of an inch before the oscillator changes from an oscillating condition to a nonoscillating condition or vice versa. The resistance 32 may also be considered as a device whereby the coupling between the input and output circuits of the oscillator may be effectively changed for achieving this operation. Resistance 34, which is in series with resistance 32, serves as a limiting resistance.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a system of the character described, an oscillating network, said oscillating network comprising a transistor, a pair of inductively coupled coils, a source of unidirectional energizing voltage having a positive terminal and a negative terminal, the base of said transistor being connected to said negative terminal through one of said coils, a phasing condenser connected in shunt with said one coil, the collector electrode of said transistor being connected to said negative terminal through the other of said pair of coils, the emitter electrode being connected to said positive terminal of said source, a vane movable between said pair of coils and effective within a range of its movement to render said oscillation network ineffective to develop oscillations, an adjustable loading circuit coupled to said collector electrode for adjusting the loading of said network so as to control said range of movement of said vane necessary to render said oscillation network ineffective to develop oscillations.

2. An oscillation network of the character described comprising, a transistor, a first coil, a second coil, said first and second coils being inductively coupled, a source of unidirectional voltage having a negative terminal and a positive terminal, a first resistance, a bypass condenser connected in shunt with said resistance, the base electrode of said transistor being connected to said negative terminal through said first coil and said first resistance, a phasing condenser connected in shunt with said first coil, a second resistance, a second bypass condenser connected in shunt with said second resistance, the emitter of said transistor being connected through said second resistance to said positive terminal, the collector of said transistor being connected to said negative terminal through said second coil, adjustable resistance means, a coupling condenser, said collector being connected through said coupling condenser and said adjustable resistance means to said negative terminal, a vane movable between said first and second coils and effective within the range of its movement to change said oscillation network from an oscillating condition to a nonoscillating condition, and adjustment of said resistance means being effective to adjust said range wherein said oscillation network is changed from an oscillating condition to a nonoscillating condition.

References Cited in the file of this patent

UNITED STATES PATENTS

| | | |
|---|---|---|
| 2,411,247 | Cohen | Nov. 19, 1946 |
| 2,778,574 | Moore et al. | Jan. 22, 1957 |
| 2,778,942 | Ehret et al. | Jan. 22, 1957 |

FOREIGN PATENTS

| | | |
|---|---|---|
| 367,928 | Great Britain | 1932 |